(12) United States Patent
Stanos et al.

(10) Patent No.: US 7,059,202 B2
(45) Date of Patent: Jun. 13, 2006

(54) MULTI-AXIS FORCE/TORQUE SENSOR AND DATA ACQUISITION SYSTEM

(75) Inventors: Lawrence C. Stanos, Midland, MI (US); Bethanne L. Valentine, Freeland, MI (US); Jeramy M. Dubay, Hope, IL (US); Timothy D. Stark, Midland, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 136 days.

(21) Appl. No.: 10/844,292

(22) Filed: May 12, 2004

(65) Prior Publication Data

US 2005/0252309 A1 Nov. 17, 2005

(51) Int. Cl.
*G01L 1/22* (2006.01)
*G01D 7/00* (2006.01)
(52) U.S. Cl. .............................. 73/862.044; 73/862.043
(58) Field of Classification Search ........... 73/862.044, 73/862.043
See application file for complete search history.

(56) References Cited

U.S. PATENT DOCUMENTS

| 176,525 | A | | 4/1876 | Fry |
|---|---|---|---|---|
| 1,242,837 | A | | 10/1917 | Moberg |
| 1,390,627 | A | | 9/1921 | Lindahl |
| 1,567,148 | A | * | 12/1925 | Jennings ...................... 417/69 |
| 2,337,951 | A | | 12/1943 | Whitehead |
| 2,782,574 | A | | 2/1957 | Copold |
| 3,354,705 | A | | 11/1967 | Dyer, Jr. |
| 3,613,443 | A | * | 10/1971 | Curry ........................... 73/147 |
| 3,640,130 | A | | 2/1972 | Spescha et al. |
| 3,866,463 | A | | 2/1975 | Smith et al. |
| 3,939,704 | A | | 2/1976 | Zipin |
| 4,109,314 | A | * | 8/1978 | Meyer et al. .................. 702/23 |
| 4,199,032 | A | | 4/1980 | Weiner et al. |
| 4,259,863 | A | | 4/1981 | Rieck et al. |
| 4,315,427 | A | | 2/1982 | Leiter et al. |
| 4,357,006 | A | | 11/1982 | Hayes |
| 4,398,429 | A | | 8/1983 | Cook et al. |
| 4,674,340 | A | | 6/1987 | Burt et al. |
| 4,716,772 | A | | 1/1988 | Bubeck et al. |
| 4,794,788 | A | | 1/1989 | Masters et al. |
| 4,794,801 | A | | 1/1989 | Andrews et al. |
| 4,811,850 | A | | 3/1989 | Bankuty et al. |
| 4,850,230 | A | | 7/1989 | Eldridge |
| 4,907,168 | A | | 3/1990 | Boggs |
| 4,907,700 | A | | 3/1990 | Bankuty et al. |
| 4,957,002 | A | | 9/1990 | Coyle, Jr. et al. |
| 4,989,459 | A | | 2/1991 | Faber, Jr. |
| 5,031,459 | A | | 7/1991 | Twerdochlib |
| 5,090,244 | A | * | 2/1992 | Potier et al. ................... 73/572 |

(Continued)

FOREIGN PATENT DOCUMENTS

JP 07005057 A * 1/1995

(Continued)

OTHER PUBLICATIONS

ATI Industrial Automation 2003 Catalog, Apr. 2003, ATI Industrial Automation, Pinnacle Park, 1031 Goodworth Drive, Apex, NC 27539, 28 pages.

(Continued)

*Primary Examiner*—Edward Lefkowitz
*Assistant Examiner*—George P Bonanto (57) ABSTRACT

A multi-axis force analyzer and data acquisition system is disclosed. Using non-invasive structure, parts to be tested are analyzed without obstructing user access or defacing the object in any way. Accordingly, the forces required to open and close a container can be accurately and easily measured.

68 Claims, 7 Drawing Sheets

U.S. PATENT DOCUMENTS

| | | | |
|---|---|---|---|
| 5,239,873 A | | 8/1993 | Cox |
| 5,319,984 A | * | 6/1994 | Humphries et al. ...... 73/862.21 |
| 5,372,268 A | * | 12/1994 | Han ........................... 215/232 |
| 5,400,661 A | * | 3/1995 | Cook et al. ............ 73/862.043 |
| 5,415,050 A | | 5/1995 | Trendel et al. |
| 5,487,536 A | | 1/1996 | McEachin |
| 5,680,418 A | * | 10/1997 | Croft et al. ................. 375/346 |
| 5,717,144 A | | 2/1998 | Dunaway |
| 5,937,559 A | * | 8/1999 | Jennen ........................... 42/94 |
| 6,508,137 B1 | | 1/2003 | Suzuki |
| 6,536,068 B1 | * | 3/2003 | Yang et al. ................... 15/105 |
| 6,615,672 B1 | * | 9/2003 | Stalnaker et al. ............. 73/818 |
| 6,823,744 B1 | * | 11/2004 | Ohsato et al. ......... 73/862.041 |
| 6,915,709 B1 | * | 7/2005 | Okada ................... 73/862.041 |
| 2003/0147062 A1 | | 8/2003 | Morisada |
| 2005/0160794 A1 | * | 7/2005 | Sonntag et al. ................ 73/40 |

FOREIGN PATENT DOCUMENTS

JP         2002214055 A  *  7/2002

OTHER PUBLICATIONS

"Multi-Axis Transducers," web page printed on Apr. 6, 2004, http://www.amtiweb.com/industrial/multi-axis.htm, AMTI, 176 Waltham Street, Watertown, MA 02472, 2 pages.

* cited by examiner

MULTI-AXIS FORCE/TORQUE SENSOR AND DATA ACQUISITION SYSTEM

FIELD OF THE DISCLOSURE

The disclosure generally relates to a system and method for acquiring multi-axis force data and, more particularly, relates to a system and method for acquiring multi-axis force data related to removing a lid from a container.

BACKGROUND OF THE DISCLOSURE

Containers used to preserve foods and other perishable goods are particularly dependent on the seal integrity of the container. Such containers employ a variety of sealing mechanisms including threaded lids, frictionally interfacing tops which deflect or "snap" into place, mating tongue and groove strips or the like. In those containers using threaded tops, the seal integrity is dependent on the tolerance of the threads as well as the torque applied to the lid when closing. With lids which snap into place, the seal integrity is again dependent on the tolerances under which the lid and container rims are manufactured, as well as the material from which they are made, and the degree of deflection needed to secure the lid into a closed position.

Customer satisfaction naturally involves an adequate seal, but also the ease with which the customer can use the container. If the container requires a high rotational or lateral force to open or close, then the customer may become frustrated even when the seal is effective. Additionally, the method by which various customers grasp and otherwise handle the container includes an array of various dynamics. Such dynamics may include whether the customer is right handed, left handed, the strength, age, and dexterity of the user, and how they choose to grasp the container cover.

Force analysis of container caps, particularly in the pharmaceutical industry, is known in order to verify that proper sealing forces are applied to a medicine cap during the manufacturing process and to ensure proper levels of force are required to open the container if the bottle is to be resistant to child opening or the like. However, during seal testing the container body is surrounded by various invasive clamps and fixtures to keep it immobile during force analysis of the cap removal. Such a configuration prevents a force analysis representative of a human hand while opening or closing the cap in a more "natural" manner. Alternatively, the obstructive mounting hardware may be eliminated by bolting the container to the platform, however, this requires piercing the container and thus has uncertain results on the structural integrity of the container.

It would, therefore, be advantageous to analyze various dynamic multi-axis forces applied to a container during the process of opening or closing its cover, in which the container is not obscured by fixturing hardware or damaged by an invasive fixturing process.

SUMMARY OF THE DISCLOSURE

In accordance with one aspect of the disclosure, a multi-axis force analyzer system is disclosed which may comprise a controller having a processor, an input and a memory. The input and the memory may be operatively coupled to the processor. The system may also comprise a platform having one or more orifices operatively coupled to a vacuum, the vacuum adapted to secure a part to the platform. The multi-axis force analyzer system may also comprise a force sensor operatively coupled to the platform to provide force signals to the input, wherein the force signals are indicative of the forces applied to the part.

In accordance with another aspect of the disclosure, a method of measuring forces required to remove a lid from a container is disclosed which may comprise positioning the container on a platform, securing the container to the platform using a vacuum, removing the lid from the container, and sensing the forces applied to the container during the removing step.

In accordance with another aspect of the disclosure, a system for measuring the force required to remove a lid from a container is disclosed which may comprise a platform adapted to receive the container, a vacuum source generating a vacuum toward the platform, and a sensor operatively associated with the platform adapted to measure a force applied to the container and emit a signal representative of the force. The system may also comprise a controller adapted to receive the signal from the sensor and generate a display indicative of the force.

In accordance with one aspect of the disclosure, a multi-axis force analyzer system is disclosed which may comprise a controller having a processor, an input and a memory. The input and the memory may be operatively coupled to the processor. The system may also comprise a platform comprising a non-invasive securing means, the securing means adapted to secure a part to the platform. The multi-axis force analyzer system may also comprise a force sensor operatively coupled to the platform to provide force signals to the input, wherein the force signals are indicative of the forces applied to the part.

These and other aspects and features of the disclosure will become more readily apparent upon reading the following detailed disclosure when taken in conjunction with the accompanying drawings.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Figure 1:
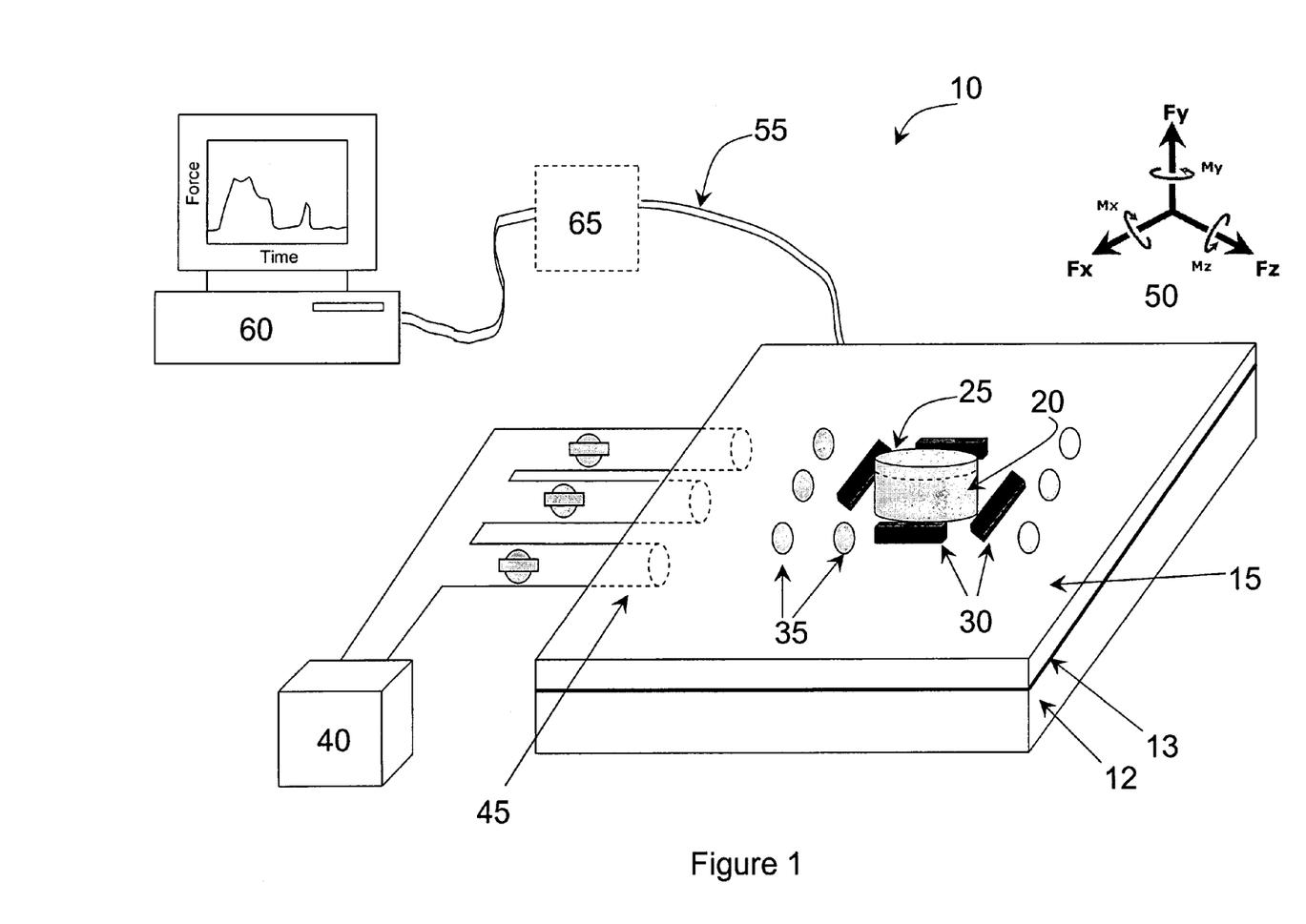
FIG. 1 is a diagram representative of a force analyzer system constructed in accordance with the teachings of the disclosure.

Referring now to the drawings, and with specific reference to FIG. 1, a multi-axis force analyzer system constructed in accordance with the teachings of the disclosure is generally referred to by reference numeral 10. As illustrated therein, the multi-axis force analyzer system 10 can be used to analyze forces associated with applying and removing a cover of a container. One of ordinary skill in the art will readily understand the teachings of this disclosure can be used with the testing of other objects as well. Examples include removing and applying food wraps to bowls, cutting food against a cutting board or sheet, tearing food wrap from a dispenser and the like.

With respect to the multi-axis force analyzer system 10, a housing 12 may include a platform 15 on which to mount a container 20 having a cover 25. The container 20 may be mounted to the platform 15 with adjustable fences 30, or other stabilizers, to guide the container on the platform 15 or, optionally, to non-invasively secure the container 20 to the platform 15.

The platform 15 may also be equipped with a plurality of orifices 35 operatively coupled to a vacuum module 40. A vacuum network 45, discussed in greater detail later, may communicate the vacuum force to one or more orifices 35 which secures the container 20 to the platform 15 in a non-invasive manner in lieu of, or in addition to, the adjustable fences 30. Alternatively, magnets may be placed in the container 20 to securely hold it to the platform 15, provided the platform material has ferromagnetic properties. Moreover, the vacuum module 40 may be equipped with a variable vacuum strength setting to accommodate to the size, and other features, of the container 20. Alternatively, the vacuum network 45 may include one or more valves or regulators for controlling air flow and vacuum strength. Compressible foam or rubber gaskets provide a vacuum tight seal between the container 20 and the platform 15.

Figure 2:
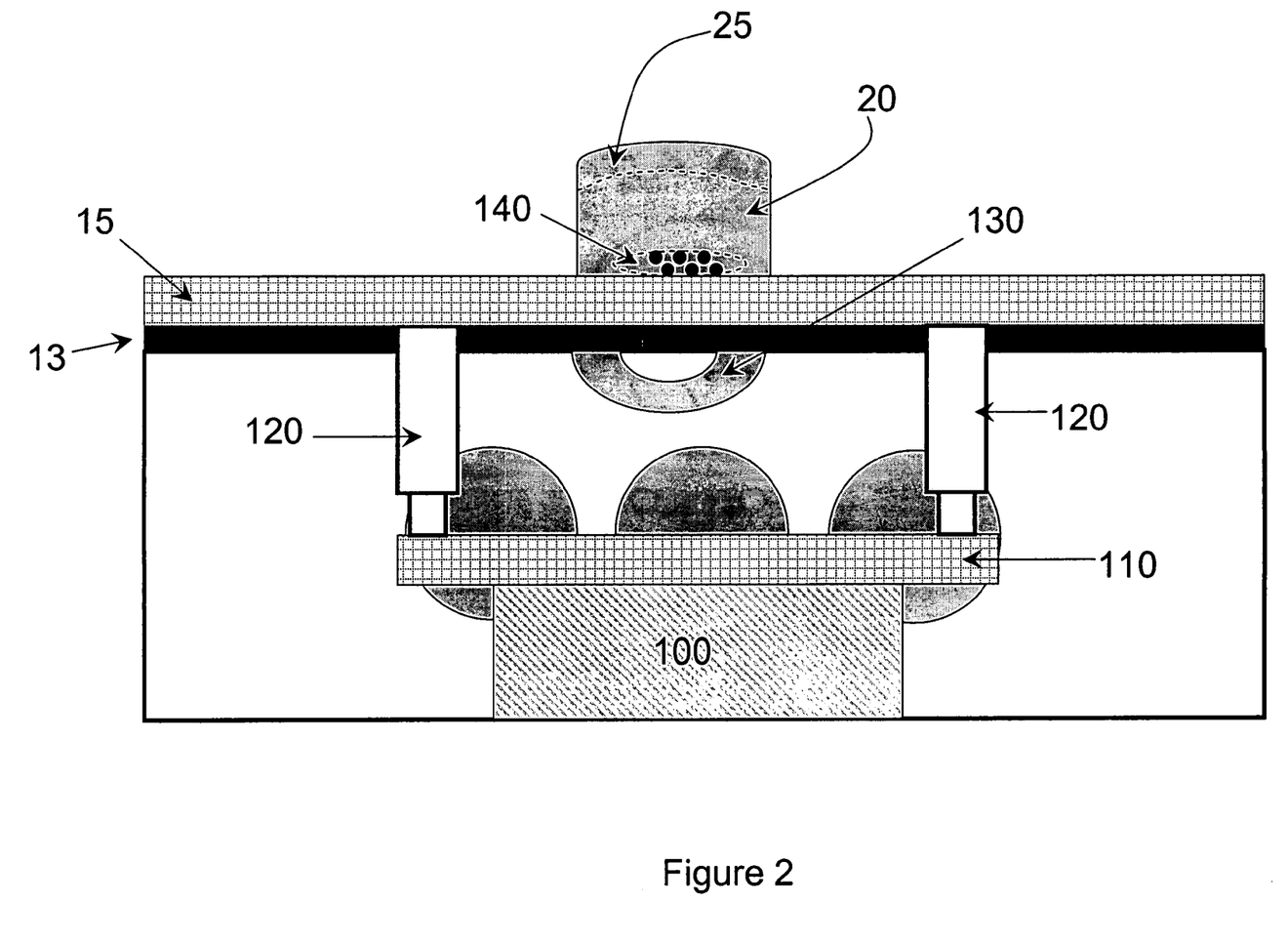
FIG. 2 is a section diagram representative of a cut-away side view of the force analyzer enclosure constructed in accordance with the teachings of the disclosure.

Referring to FIG. 2, the platform 15 may further be equipped with one or more force transducers 100, discussed in further detail later, operatively coupled to the platform 15 via a mounting plate 110 and stand-offs 120, to provide signals indicative of forces applied to the platform 15 and, consequently, indicative of any forces applied to a container 20 mounted on that platform 15. The stand-offs 120 create a gap 13 (also shown in FIG. 1 by a dotted line) between the housing 12 and the platform 15 and, as a result, all forces acting upon the platform 15 transfer to the force transducers 100 and not the housing 12. FIG. 2 also illustrates an optional electromagnet 130 and ferromagnetic material 140, which will be discussed in greater detail herein.

Returning to FIG. 1, there are generally three conventional orthogonal degrees of freedom in a rectangular coordinate system 50 having an x-axis, y-axis, and z-axis. Each of these three axes has a rotational degree of freedom about it, wherein those rotational forces are referred to as a torque or a moment. The force transducer 100 is capable of providing force data for one or more of these axes. Furthermore, some force transducers may be provided in any known form including, but not limited to, strain gauges, torque meters, and force sensors. These devices may provide torque data about one or more axes while other transducers will only provide force data for the conventional axes wherein torque data must be subsequently derived in a post processing operation.

Signals from the force transducer may be transmitted through a cable harness 55 to a computer 60 for data collection, data storage, post processing, and graphing. The force signals may, optionally, pass through a signal conditioner 65 to eliminate unwanted vibration and noise signals. Alternatively, signal conditioning functionality may occur in the computer 60 by way of an algorithm, as discussed in further detail herein.

Figure 3:
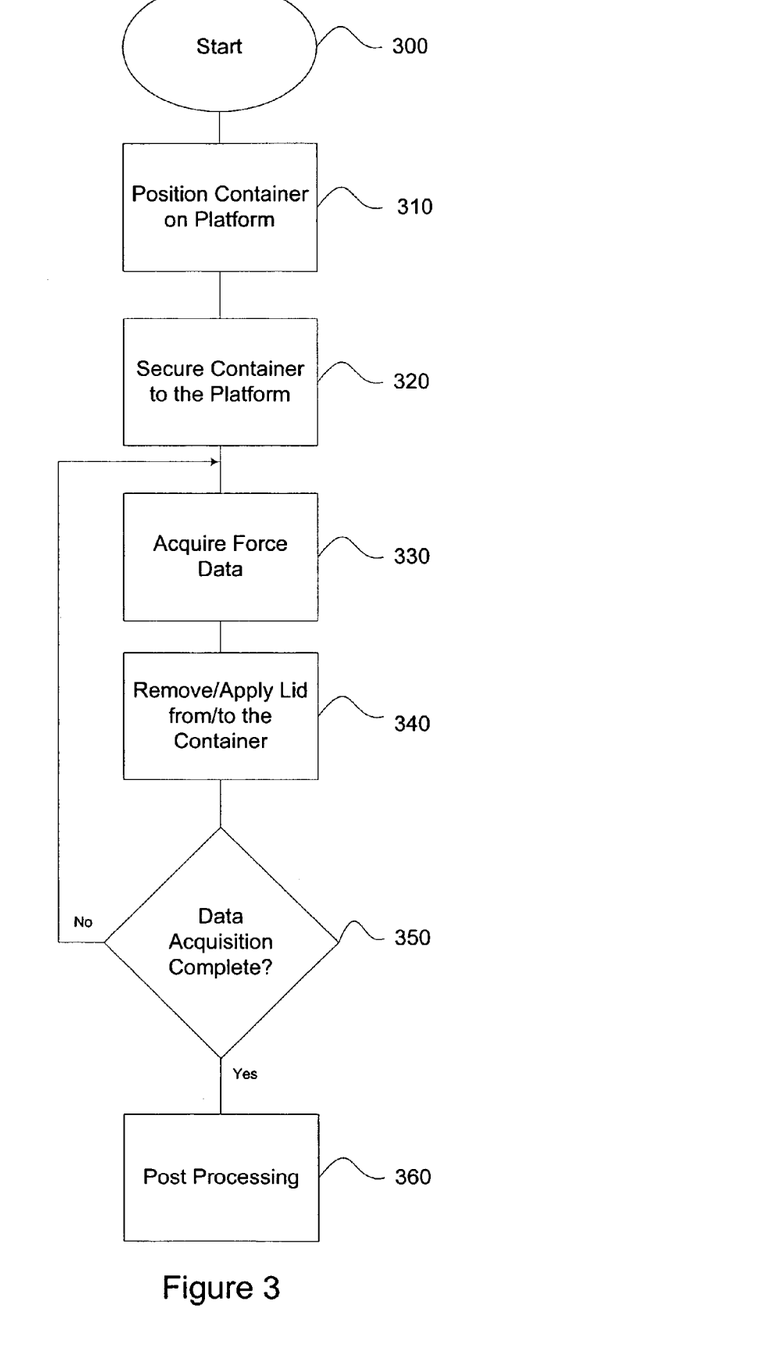
FIG. 3 is a flowchart illustrating steps of force analysis in accordance with the teachings of the disclosure.

Referring now to FIG. 3, a general flowchart of a multi-axis force analyzer method in accordance with the teachings of the disclosure is shown. The method may begin at 300 by positioning a container 20 on the platform 15 as shown in step 310 having a subsequent step of securing the container 20 to the platform 15 as shown in step 320. As discussed earlier, either the adjustable fences 30, magnets, a vacuum force from that vacuum module 40, or other non-invasive structures may secure the container 20 to the platform 15. Alternatively, the container may be secured to the platform 15 with the electromagnet 130 energized while the ferromagnetic material 140 partially fills the container 20. Preferably, step 330 begins after a vacuum pressure stabilization period and some preliminary non-transient data is acquired prior to any interaction with the container during cover 25 attachment or removal. Shortly thereafter, an operator begins the attachment or removal of the container cover 25 at step 340 and steps 330 through 350 iterate until a predetermined threshold occurs. Such thresholds may include a time duration, force limit, or a manual stop command issued by an operator through the computer 60. When the data acquisition iteration completes, post processing, including statistical analysis of the acquired data, may occur at step 360.

Figure 4:
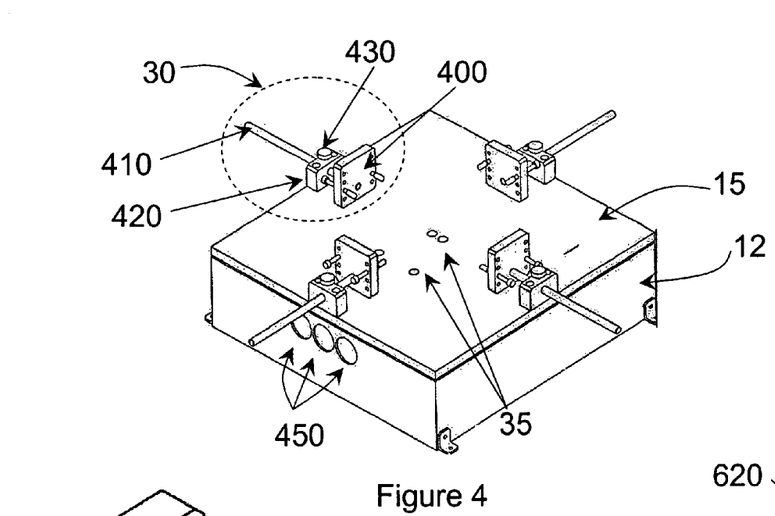
FIG. 4 is an isometric view of the force analyzer platform and fixturing hardware constructed in accordance with the teachings of the disclosure.

Referring to FIG. 4, in one embodiment the housing 12 includes a platform 15 that may accommodate a variety of different container shapes and sizes. Adjustable fences 30, four of which are shown, may include a centering block 400 operatively coupled to a slideable dowel 410. The dowel 410 may be further supported by adjustment blocks 420 mounted on the platform 15 having adjustment screws 430 allowing the slideable dowel 410 to be tightened in place.

Figure 5:
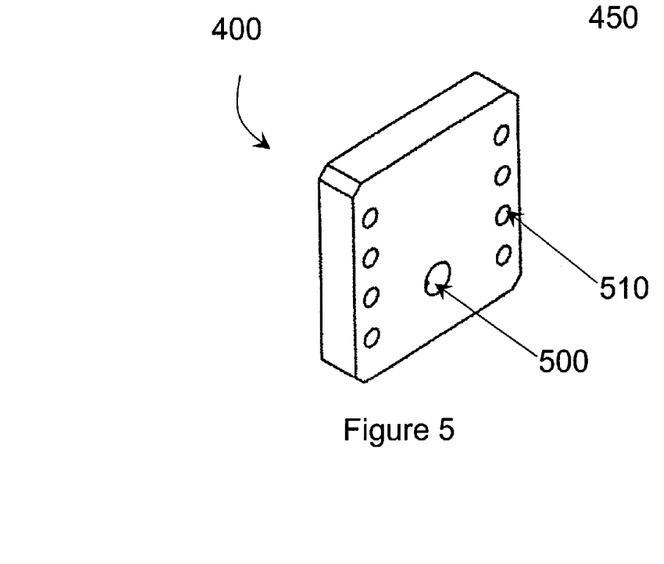
FIG. 5 is a close-up isometric view of a centering block constructed in accordance with the teachings of the disclosure.

FIG. 5 illustrates an enlarged view of the centering block 400 showing a receiving hole 500 for the dowel 410. The receiving hole 500 may be threaded to receive mating threads of the slideable dowel 410. Alternatively, the receiving hole 500 may be non-threaded and secure the slideable dowel 410 through the use of a set screws, similar to the adjustment screw 430 discussed earlier. Several other holes 510 may be machined into the centering block 400 to allow use of various implements for securing the container 20.

Such implements may include plastic covered bolts threaded into the holes 510 to secure the container 20 without damaging or marring it.

Figure 6:
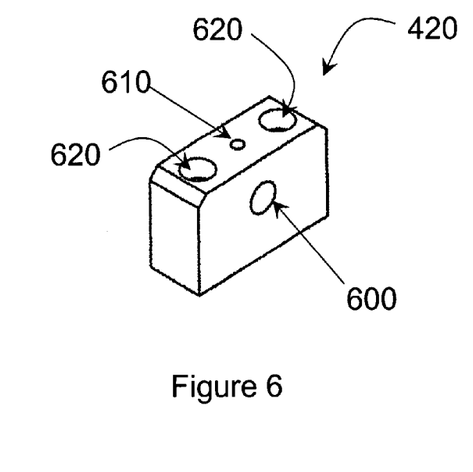
FIG. 6 is a close-up isometric view of an adjustment block constructed in accordance with the teachings of the disclosure.

FIG. 6 illustrates an enlarged view of the adjustment block 420 showing a receiving hole 600 for the dowel 410, and a threaded hole 610 which accepts the adjustment screw 430. Tightening the adjustment screw 430 prevents the dowel 410 in the receiving hole 600 from sliding. Two additional mounting holes 620 permit the adjustment block 420 to be mounted to the platform 15. Several other fixturing embodiments are possible. While the adjustable fences 30 may be used to secure the container 20 to the platform 15, they may also obstruct an operator while attempting to attach or remove the container lid 25 during testing. As such, the vacuum orifices 35, shown in FIGS. 1 and 4, may both vary in number and location throughout the platform 15 to accommodate various container shapes and sizes, particularly containers having multiple compartments.

Figure 7:
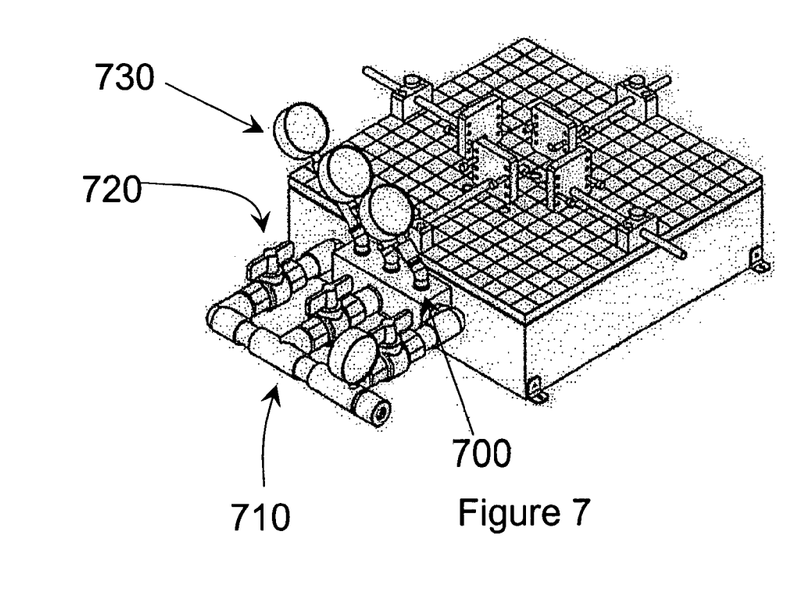
FIG. 7 is an isometric view of the force analyzer platform and external vacuum network components constructed in accordance with the teachings of the disclosure.
Figure 8:
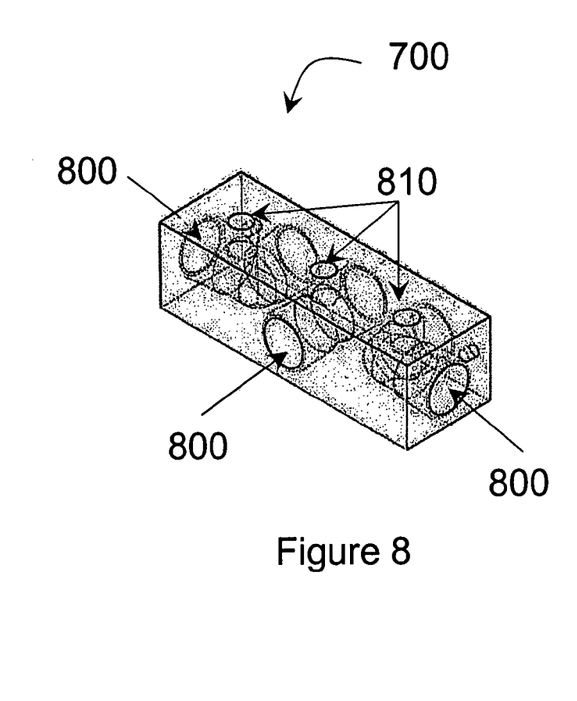
FIG. 8 is a close-up isometric view of a manifold block constructed in accordance with the teachings of the disclosure.

Briefly returning to FIG. 4, the side of the enclosure 12 may include openings 450 to allow connection of the vacuum network 45. FIG. 7 illustrates the external components of the vacuum network 45, including an air manifold block 700. The air manifold block 700 operably connects vacuum pipes 710, valves or regulators 720, and vacuum pressure indicators 730 to the enclosure 12. The air manifold block 700 is shown again in FIG. 8 wherein the block 700 includes vacuum pipe mounting holes 800 and vacuum indicator dial mounting holes 810. The vacuum pressure indicators 730 may indicate the magnitude of the vacuum pressure and provide feedback to an operator when adjusting the valves 720 on each of three ports shown. While the valves may effectively open or close (non-adjustable) various paths of the vacuum network, vacuum regulators may also be employed to allow adjustable vacuum pressure control within specific paths of the vacuum network 45. Alternatively, the regulators 720 may be computer controlled and the vacuum pressure indicators 730 may generate a vacuum pressure output signal to the computer 60 to maintain a pre-determined vacuum pressure set-point using a feedback algorithm.

Figure 9:
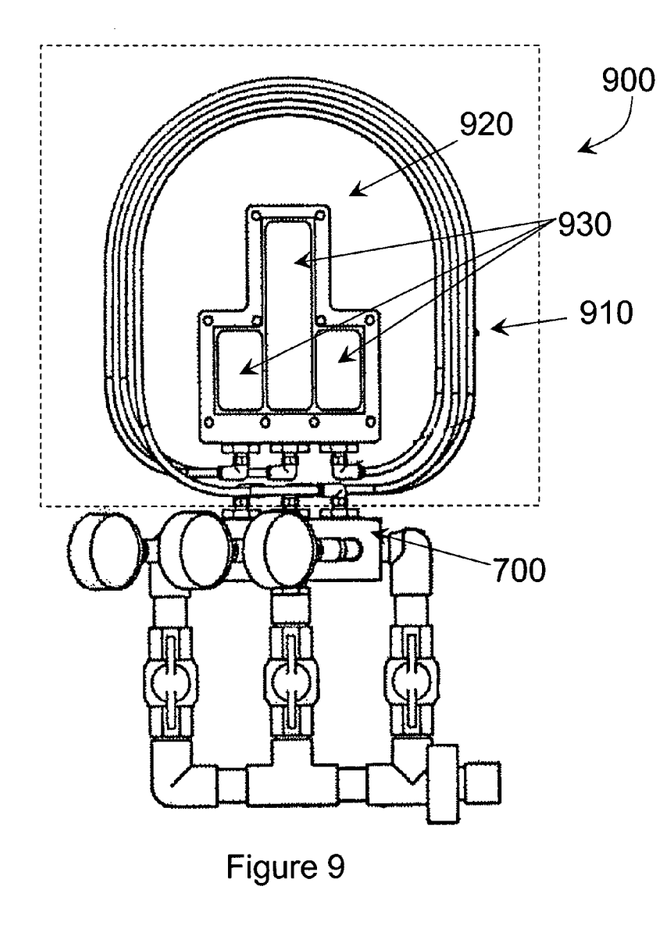
FIG. 9 is a top view of the vacuum network components constructed in accordance with the teachings of the disclosure.
Figure 10:
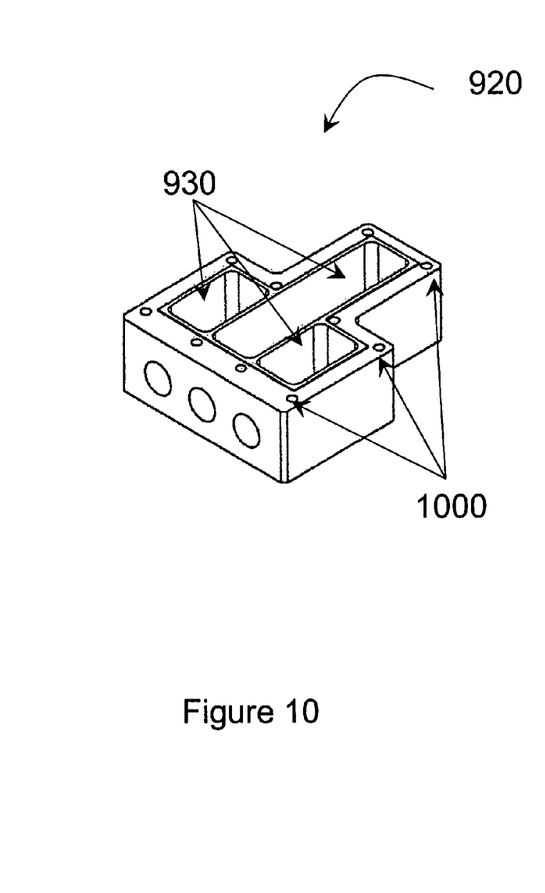
FIG. 10 is a close-up isometric view of a vacuum block constructed in accordance with the teachings of the disclosure.

FIG. 9 illustrates both the internal and external components of the vacuum network 45, wherein the internal components 900 reside within the enclosure 12 as represented by the dashed box. The vacuum pressure communicated through the air manifold block 700 continues through flexible coiled vacuum tubing 910, and into a vacuum block 920. The vacuum block 920 is mounted directly beneath the platform 15, wherein each of three chambers 930 aligns directly beneath one or more orifices of the platform 15. The vacuum block 920 is again shown isometrically in FIG. 10 having mounting holes 1000 throughout its perimeter to enable mounting to the platform 15.

Returning to FIG. 9, the flexible coiled vacuum tubing 910 communicates the vacuum pressure to the orifices 35 while avoiding the creation of significant reaction forces related to the vacuum network 45 connections.

The testing procedure may be controlled through the computer 60 by way of a control program. The computer 60 may be provided in any number of different forms including conventional personal computers having a display screen. The display screen may be a stand-alone monitor as in a conventional desk top personal computer (PC) or provided in an integral screen such as that provided within a laptop computer and typically provided in a form of a liquid crystal display (LCD) or glass plasma display. Alternatively, the computing device can be any other form of smart computing device including, but not limited to desktop computers, laptop computers, and microcontrollers.

Figure 11:
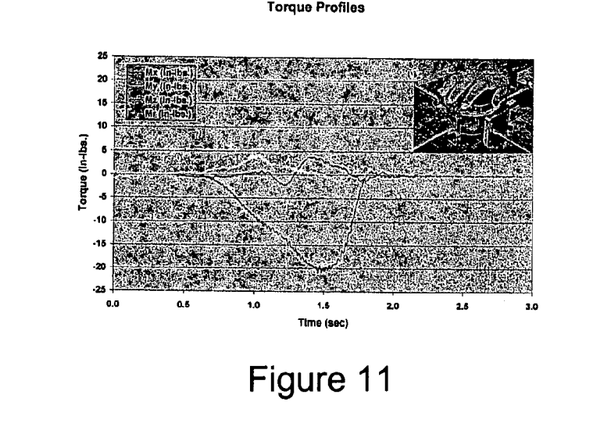
FIG. 11 is a torque versus time plot constructed in accordance with the teachings of the disclosure.
Figure 12:
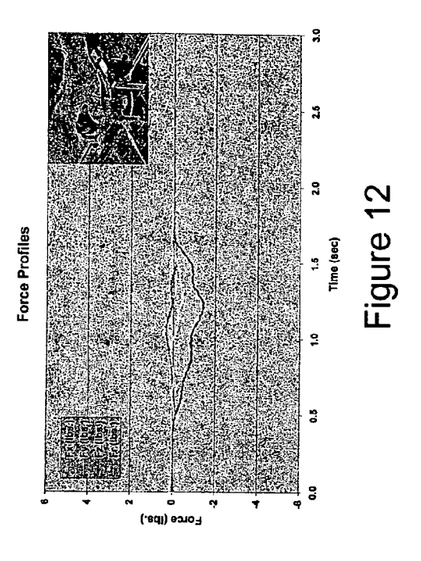
FIG. 12 is a force versus time plot constructed in accordance with the teachings of the disclosure.
Figure 13:
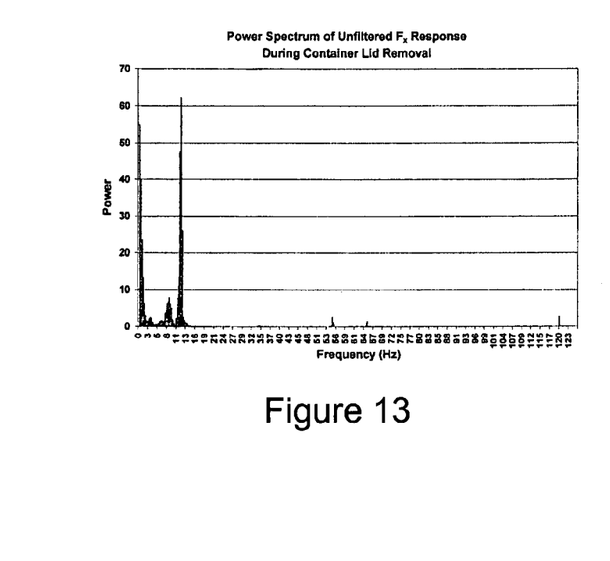
FIG. 13 is a non-filtered power versus frequency plot constructed in accordance with the teachings of the disclosure.
Figure 14:
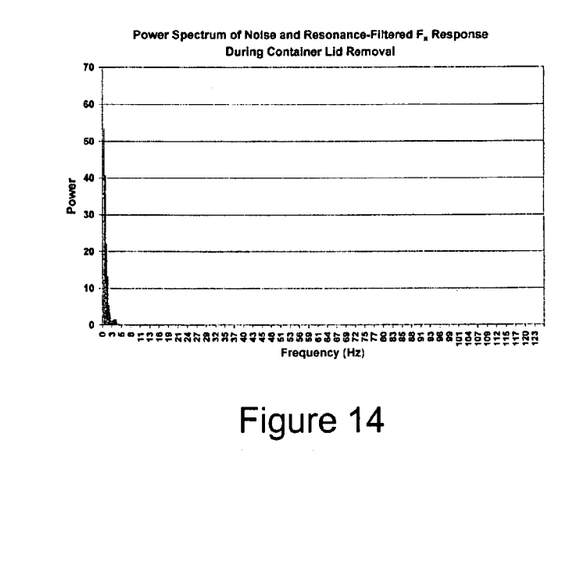
FIG. 14 is a filtered power versus frequency plot constructed in accordance with the teachings of the disclosure.

The control program may include a graphical user interface (GUI) which provides general setup instructions to an operator through the display screen. Upon initiating the setup, the operator may be instructed to enter, inter alia, test identification information including a sample number, cycle number, container size/type, and operator initials. The user interface may also provide, inter alia, visual prompts informing the operator how to load a container 20 on the platform 15, how to secure the container 20 using either the adjustable fences 30, vacuum 40, or magnets, and when to begin the process of attaching or removing the cover 25. Aside from test procedure instructions, the control program may also allow the operator to set various test operating parameters including, but not limited to, test duration, test container data, and post processing instructions. Such post processing instructions may include statistical data analysis relating to force averages, force maximums, minimums, standard deviations, and calculation of moments and forces around alternate reference points of the platform 15. Additionally, the control program may include various signal conditioning algorithms to eliminate unwanted vibration and noise signals. Standard signal filters such as a first order Butterworth filters are common, which preferably have a flat pass band and steep roll-off rate. Optionally, the control program may generate a live plot of the force versus time while the operator is interfacing with the container. Alternatively, the operator may request graphical data at a later time by simply referencing a stored sample number or cycle number. The graphical data may include, but not be limited to, torque versus time, force versus time, (both of which are shown as FIGS. 11 and 12, respectively), force versus frequency, and torque versus frequency. The graphical data may also include power versus frequency plots, wherein effects of non-filtered versus filtered data are shown in FIGS. 13 and 14, respectively. Furthermore, the graphical data may distinctly illustrate transient forces and frequencies of each individual axis independent of the other axes.

Upon completion of general setup procedures, the operator may be presented with a start button (either through the computer GUI or a button panel nearby) that upon pressing, may initiate the vacuum and begin acquiring data. Further visual prompts on the GUI may instruct the operator to begin attaching or removing the container lid 25 while the resulting forces are captured by the force sensors and collected by the computer 60. The test may stop after a pre-determined time period or when the operator presses a stop button. In the event a large batch of containers is tested, the control program may automatically increment the sample number or cycle number after a test while the operator loads a new container on the platform 15. Alternatively, the control program may sequentially test container opening immediately before container closing for each container tested, or vice-versa.

Referring again to FIG. 3, positioning the container 20 on the platform 15 at step 320 may utilize the adjustable fences 30 as guides rather than a means of attaching the container 20 securely to the platform 15. After precise placement of the container 20 on the platform 15, the adjustable fences 30 may be moved out of the way and the vacuum pressure communicated through the orifices 35 will maintain the container 20 securely in place. Alternatively, the adjustable fences 30 may be left in place if they do not occlude the hands of the operator during testing. Also, alternatively, another of the non-invasive structures referenced above may be used to secure the container in place.

Control of the vacuum at step 320 may be accomplished via a manual power switch, or incorporated through the control program accessible to the operator through the GUI. Additionally, the vacuum pressure indicators 730 may be adapted to provide a digital signal which may be received by the computer 60. The control program may use this vacuum pressure data in a feedback loop algorithm to maintain the vacuum pressure at a desired set-point.

Data acquisition begins at step 330 after the operator selects a "start" icon, or similar, on the GUI. Alternatively, the operator may press a start button, or similar, operatively coupled to the control program. Data may be initially acquired even though no forces are being applied to the container 20 in order to establish a baseline, especially if the weight of the container 20 is not negligible. The container 20 weight may cause the force sensor to indicate a force, for example, in the −z direction. Such a baseline may be noted by the control program to compensate measured data relative to the actual "applied" forces during opening or closing of the container cover 25.

Step 340 may prompt the operator to begin (or continue) removal or application of the container cover 25. Steps 330, 340, and 350 may iterate as many times as necessary to complete a test. Test completion may result in acquired data immediately being processed and graphed at step 360, or the data may simply be stored in the computer 60 for later analysis. Whether or not a hardware-based signal conditioner 65 was used during data acquisition, subsequent digital signal conditioning algorithms may be applied to the data for, inter alia, elimination of environmental vibration and natural resonant frequency components.

While the aforementioned disclosure presents the platform 15 in a substantially horizontal orientation, the platform 15 may also have a vertical orientation. In this embodiment the part under test may be a window, which allows testing of window cleaner products and their cleaning efficacy. The work performed by a test subject cleaning the window is estimated by multiplying the average applied force by the distance wiped by the test subject.

Similarly, in another embodiment, returning the platform 15 to the horizontal orientation and placing it on the floor allows estimation of floor cleaner efficacy when the test subject mops a floor sample mounted to the platform 15. Again, the work performed is a product of applied force and distance mopped.

From the foregoing, one of ordinary skill in the art will readily appreciate that the teachings of the disclosure can be used to construct and use a multi-axis force analyzer providing the user with reliable test data as well as unobstructed access to the tested unit without physically impairing the testing unit in any manner.

What is claimed is:

1. A multi-axis force analyzer system for a container and lid, comprising:
    a controller including a processor, an input, and a memory, the input and the memory operatively coupled to the processor;
    a platform having one or more orifices, the one or more orifices operatively coupled to a vacuum, the vacuum securing the container to the platform; and
    a force sensor operatively coupled to the platform to provide force signals to the input, the force signals being indicative of multi-axis forces applied to the container, the vacuum holding the container to the platform while the multi-axis forces are applied to the container.

2. The multi-axis force analyzer system of claim 1, further comprising a signal conditioner.

3. The multi-axis force analyzer system of claim 2, wherein the signal conditioner is an algorithm executed by the processor.

4. The multi-axis force analyzer system of claim 2, wherein the signal conditioner is a first order Butterworth filter.

5. The multi-axis force analyzer system of claim 1, wherein the processor is programmed to generate a graph.

6. The multi-axis force analyzer system of claim 5, wherein the graph plots at least one of time, torque, work, and force.

7. The multi-axis force analyzer system of claim 1, wherein the processor is programmed to calculate at least one of force, moment, work, peak force, peak moment, average force, and average moment.

8. The multi-axis force analyzer system of claim 1, further comprising a display.

9. The multi-axis force analyzer system of claim 1, wherein the force sensor is a strain gauge.

10. The multi-axis force analyzer system of claim 1, wherein the processor is programmed to calculate statistical parameters of the forces applied to the container.

11. The multi-axis force analyzer system of claim 1, wherein the lid is at least one of a threaded lid and a snap-fit lid.

12. The multi-axis force analyzer system of claim 1, wherein the forces applied to the container are applied manually by an operator.

13. The multi-axis force analyzer system of claim 1, wherein the vacuum is generated by an adjustable vacuum pressure module.

14. The multi-axis force analyzer system of claim 13, wherein the adjustable vacuum pressure module is controlled by at least one of the processor and a manual adjustment switch.

15. The multi-axis force analyzer system of claim 1, wherein the vacuum is controlled by at least one of a valve and a regulator.

16. The multi-axis force analyzer system of claim 15, wherein the at least one of the valve and the regulator is controlled by at least one of the processor and a manual adjustment switch.

17. The multi-axis force analyzer system of claim 1, further comprising a vacuum pressure indicator.

18. The multi-axis force analyzer system of claim 17, wherein the vacuum pressure indicator generates an output signal indicative of a vacuum force.

19. The multi-axis force analyzer system of claim 1, further including flexible coiled vacuum tubing operably coupled between the vacuum and the one or more orifices.

20. The multi-axis force analyzer system of claim 1, wherein the platform is vertically oriented.

21. A method of measuring forces required to remove a lid from a container, comprising:
    positioning the container on a platform;
    securing the container to the platform using a vacuum;
    removing the lid from the container while the vacuum holds the container to the platform; and
    sensing the forces applied to the container during the removing step.

22. The method of claim 21, further including filtering the sensed forces.

23. The method of claim 22, wherein the filtering is performed using a first order Butterworth filter.

24. The method of claim 22, wherein the filtering is performed using a software algorithm.

25. The method of claim 22, wherein the filtering is performed using a hardware filter.

26. The method of claim 21, further including generating a graph.

27. The method of claim 26, wherein the graph plots at least one of time, torque, work, and force.

28. The method of claim 21, further including calculating at least one of force, moment, work, peak force, average force, peak moment, and average moment.

29. The method of claim 21, further including providing operating instructions on a display of the controller.

30. The method of claim 21, further including storing a representation of the forces applied to the container to a memory.

31. The method of claim 21, further including adjusting vacuum pressure generated by the vacuum.

32. The method of claim 21, further including measuring the vacuum pressure.

33. A system for measuring a force required to remove a lid from a container, comprising:
a platform adapted to receive the container;
ferromagnetic material disposed in the container;
a magnet operatively associated with the platform, the magnet securing the container to the platform;
a sensor operatively associated with the platform and adapted to measure the force applied to the container and generate a signal representative of the force; and
a controller adapted to receive the signal from the sensor and generate a display indicative of the force.

34. The system of claim 33, further comprising a signal conditioner.

35. The system of claim 34, wherein the signal conditioner is an algorithm executed by the controller.

36. The system of claim 33, wherein the display indicative of the force is a graph.

37. The system of claim 36, wherein the graph plots at least one of time, torque, and force.

38. The system of claim 33, wherein the controller is programmed to calculate force moments.

39. The system of claim 38, wherein the controller is programmed to calculate a peak moment.

40. The system of claim 38, wherein the controller is programmed to calculate the force moments about a reference point.

41. The system of claim 33, wherein the controller is programmed to generate a display of operating instructions.

42. The system of claim 33, including one or more orifices embedded within the platform.

43. The system of claim 33, wherein the sensor is a strain gauge.

44. The system of claim 33, further comprising a memory.

45. The system of claim 33, wherein the controller is programmed to calculate statistical parameters of the forces applied to the container.

46. The system of claim 33, wherein the sensor generates force signals indicative of at least one of opening and closing.

47. The system of claim 33, wherein the container comprises at least one of a threaded lid and a snap-fit lid.

48. The system of claim 33, wherein the vacuum source provides an adjustable vacuum pressure.

49. The system of claim 33, further comprising a vacuum pressure indicator.

50. The system of claim 33, further including flexible coiled vacuum tubing operably coupled between the vacuum source and the platform.

51. A multi-axis force analyzer system, comprising:
a controller including a processor, an input and a memory, the input and the memory operatively coupled to the processor;
a platform having a major axis and a minor axis, the major axis being vertically oriented;
a vacuum source generating a vacuum toward the platform and holding a part to the platform; and
a force sensor operatively coupled to the platform to generate force signals to the input, the force signals indicative of the forces applied to the part as it is wiped.

52. The multi-axis force analyzer system of claim 51, wherein the vacuum is of an adjustable pressure.

53. The multi-axis force analyzer system of claim 52, wherein the adjustable vacuum pressure is controlled by at least one of the processor and a manual adjustment switch.

54. The multi-axis force analyzer system of claim 51, wherein the vacuum is controlled by at least one of a valve and a regulator.

55. The multi-axis force analyzer system of claim 54, wherein at least one of the valve and the regulator is controlled by at least one of the processor and a manual adjustment means.

56. The multi-axis force analyzer system of claim 51, further comprising a vacuum pressure indicator.

57. The multi-axis force analyzer system of claim 51, wherein the platform comprises one or more orifices to communicate the vacuum.

58. The multi-axis force analyzer system of claim 57, further including flexible coiled tubing is operably coupled between the vacuum and the one or more orifices.

59. The multi-axis force analyzer system of claim 51, further comprising a signal conditioner.

60. The multi-axis force analyzer system of claim 51, wherein the processor is programmed to generate a graph.

61. The multi-axis force analyzer system of claim 60, wherein the graph plots at least one of time, torque, work, and force.

62. The multi-axis force analyzer system of claim 51, wherein the processor is programmed to calculate at least one of force, moment, work, peak force, peak moment, average force, and average moment.

63. The multi-axis force analyzer system of claim 51, further comprising a display.

64. The multi-axis force analyzer system of claim 63, wherein the processor is programmed to generate the graph on a display of the system.

65. The multi-axis force analyzer system of claim 63, wherein the processor is programmed to generate operating instructions on the display.

66. The multi-axis force analyzer system of claim 51, wherein the force sensor is a strain gauge.

67. The multi-axis force analyzer system of claim 51, wherein the processor is programmed to calculate statistical parameters of the forces applied to the part.

68. The multi-axis force analyzer system of claim 51, wherein the force sensor generates force signals indicative of at least one of opening, closing, and wiping the part.

* * * * *